United States Patent Office 3,366,351
Patented Jan. 30, 1968

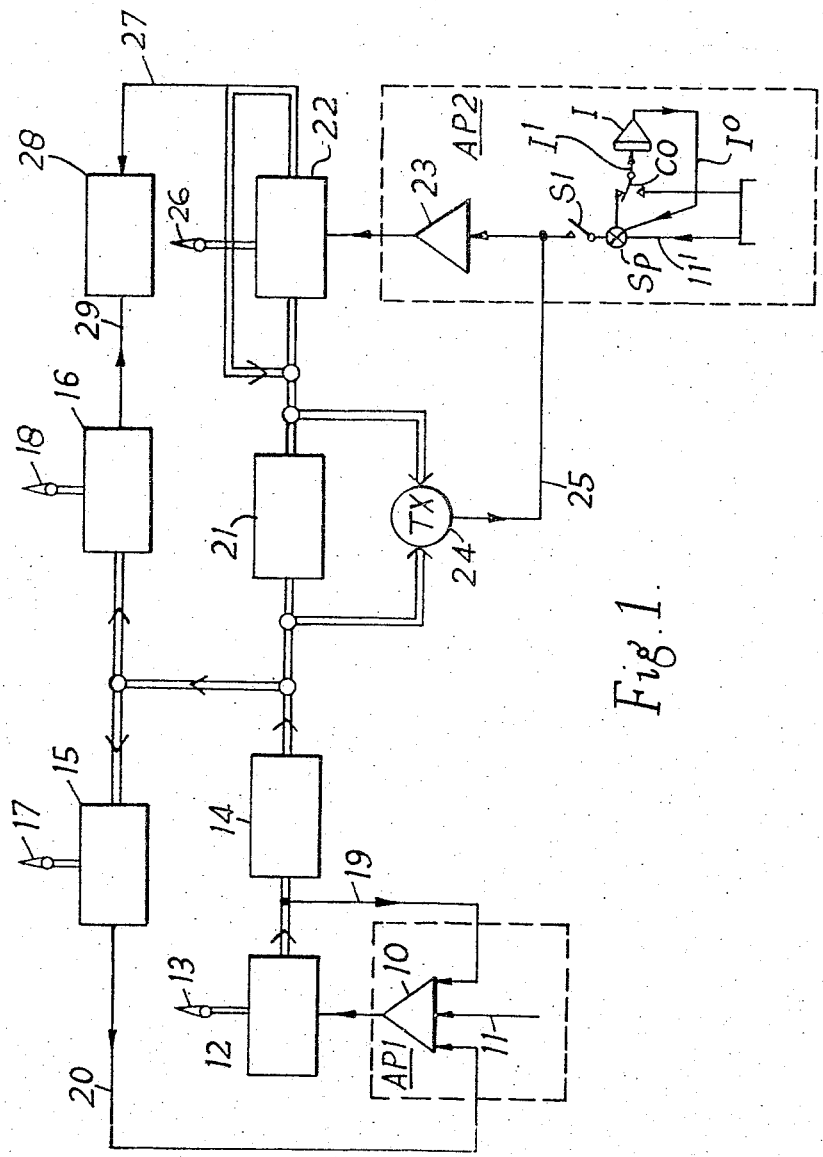

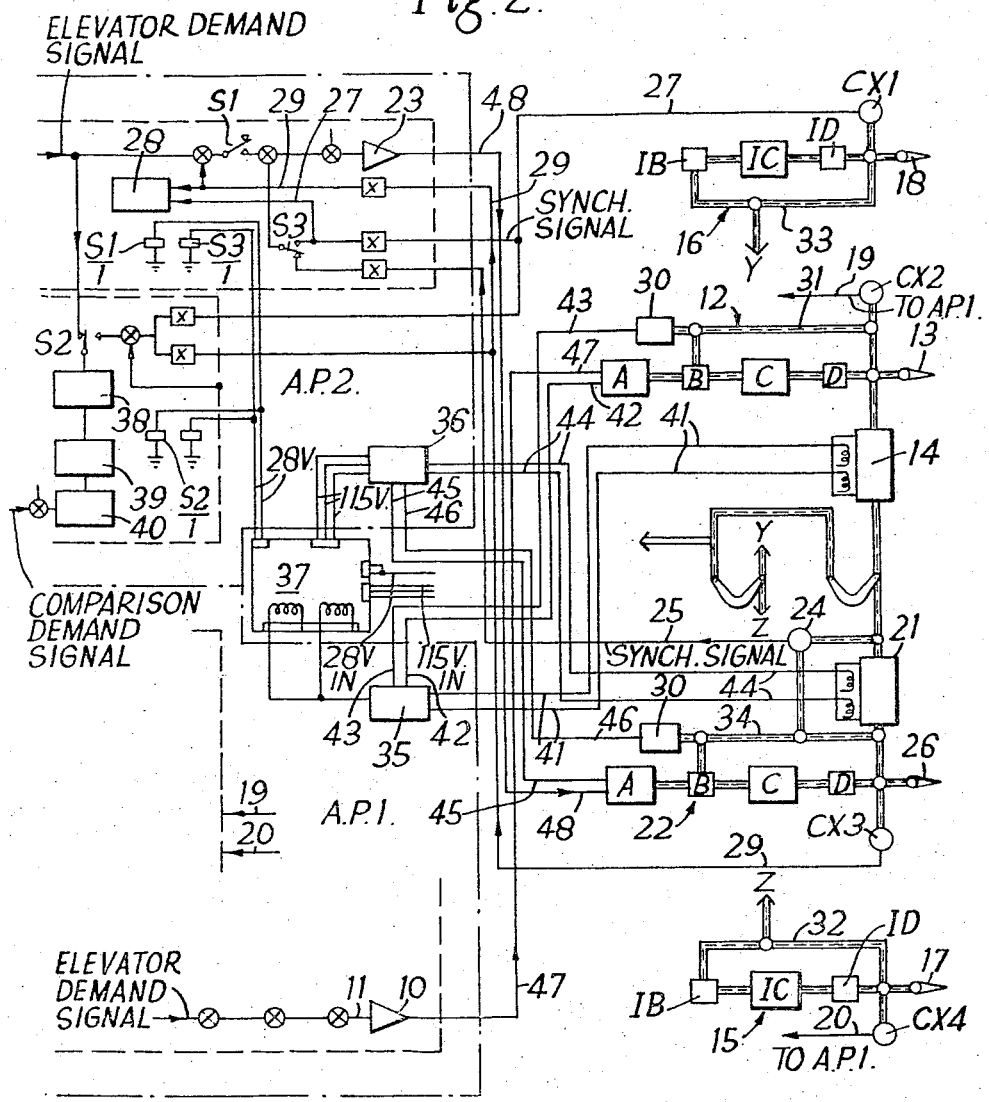

3,366,351
AIRCRAFT AUTOMATIC PILOTS
Derek Marshall and Ian Alexander Watson, London, England, assignors to Elliott Brothers (London) Limited, London, England
Filed June 3, 1966, Ser. No. 555,016
Claims priority, application Great Britain, June 4, 1965, 23,831/65
10 Claims. (Cl. 244—77)

ABSTRACT OF THE DISCLOSURE

An aircraft automatic pilot system having two automatic pilots alternatively operable and each arranged to control directly a respective control surfce. A comparator compares the positions of the two control surfaces and produces an error signal which is used, when the first automatic pilot is in use, to effect control of the position of the control surface appropriate to the second automatic pilot. In this way the two automatic pilots are made truly independent, there being no electrical or mechanical connections between them. The two automatic pilots are synchronised to allow rapid change-over when necessary.

---

The invention relates to aircraft automatic pilots.

According to the invention an aircraft automatic pilot system comprises at least two automatic pilot arrangements each capable of controlling the aircraft in flight; a first control arrangement capable of controlling the position of a first aircraft control surface according to control signals received from one of the automatic pilot arrangements; a second control arrangement capable of controlling the positon of a second aircraft control surface according to signals received from the other automatic pilot arrangement; means for putting into use alternatively one or other of the automatic pilot arrangements; means for effecting appropriate control of the first control surface when said other automatic pilot arrangement is in use; a comparator adapted to compare signals representative of the positions of the first and second control surfaces and to give an error output representative of any difference therebetween and means operative when said one automatic pilot arrangement is in use to use the error output to control, through the second control arrangement, the second control surface. Preferably the error output is applied as input to said other automatic pilot arrangement to control said second control arrangement.

Intermediate control arrangements may be provided for effecting control of further respective aircraft control surfaces, each intermediate control arrangement being mechanically linked with one of the aforementioned control arrangements. The intermediate control arrangements may be selectively linkable with the first and second control arrangements in accordance with the particular automatic pilot arrangement in use.

A monitoring arrangement may be provided which is adapted to compare the input signal to the automatic pilot in use, which input signal is representative of the required control surface position, with a monitor signal representative of the actual position of the control surface controlled by the associated control arrangement, switching means being provided to cause the automatic pilot arrangement not in use to take over control of the aircraft if a predetermined difference between the control signal and the monitor signal is determined by this comparison.

In systems in which the automatic pilot arrangement in use is effective to control at least one control surface further to said first and second control surfaces there may further be provided a monitoring arrangement adapted to compare signals representative of the actual positions of the further control surface and the control surface controlled through the control arrangement associated with the automatic pilot arrangement not in use, switching means being provided to prevent the automatic pilot arrangement not in use from taking over control of the aircraft if a predetermined difference in the positions of the control surface and the further control surface is determined by this comparison.

A further monitoring arrangement may be provided to compare the control signal to the automatic pilot arrangement with a signal representative of the position of the further control surface, the arrangement being such that the output from the automatic pilot arrangement in use is modified so as to produce compensating movements of the first and second control surfaces and any other further control surfaces if the actual position of the further control surface is incorrect by more than a predetermined amount.

When an automatic pilot arrangement is not in use the control signal therefor may be applied to an input terminal to which is connected a feed-back loop including an integrator, the feed-back loop being effective to maintain the potential on the input signal at zero level while the automatic pilot arrangement is disconnected therefrom.

The position of any control surface or further control surface may be determined by sensing the output of its associated control arrangement or associated intermediate control arrangement respectively.

The said two control arrangements may be arranged to be capable of controlling the intermediate control arrangements via respective selectively energisable run locks.

The foregoing and further features of the invention will become apparent from the following description of a prefrred embodiment thereof with reference to the accompanying drawings, in which:

FIGURE 1 shows a diagrammatic representation of a system employing two automatic pilot arrangements for controlling a number of similar aircraft control surfaces i.e. elevators, and FIGURE 2 shows a diagrammatic representation of the system of FIGURE 1 in greater detail.

Referring firstly to FIGURE 1 there is shown diagrammatically a system for utilising either one of two automatic pilot arrangements AP1 and AP2 for controlling the position, particularly during flaring of the aircraft, of a number of aircraft control surfaces, these being elevators in the embodiment shown. In FIGURE 1 double line connections represent mechanical connections and single line connections represent electrical connections. As shown in FIGURE 1 the automatic pilot arrangement AP1 is in operation controlling the position of the elevators. The automatic pilot arrangement AP1 comprises an amplifier 10 connected via a lead 11 to means (not shown) for deriving an elevator demand signal.

The output from the amplifier 10 is connected to the input of a power control arrangement 12 which is directly mechanically coupled to a control elevator 13. The power control arrangement 12 is also mechanically coupled via a run lock 14 to intermediate power control arrangements 15 and 16 each respectively directly mechanically coupled to control the positions of elevators 17 and 18. By "runlock" is meant a lockable spring strut arrangement which, when locked, presents a rigid mechanical linkage and, when unlocked presents a resilient mechanical linkage. Locking and unlocking are conveniently achieved electrically by signals applied to a solenoid in the run-lock. An electro-mechanical transducer is provided between the output of power control arrangement 12 and the run lock 14 to produce an electrical feed back signal which is fed via lead 19 to the amplifier 10. An electrical signal indicative of the output from intermediate power control arrangement 15 to position elevator 17 is fed via lead 20 to the amplifier 10. Leads corresponding to those referenced 19 and 20 are provided associated with automatic pilot arrangement AP2 but are not shown in the drawings.

The run lock 14 as well as being mechanically connected to the intermediate power control arrangements 15 and 16 is also mechanically connected via a further run lock 21 to a power control arrangement 22 which derives its electrical control input from an amplifier 23 in automatic pilot arrangement AP2. A comparator consisting of an electro-mechanical transducer 24 is mechanically connected to each of the mechanical connections to the run lock 21 so as to provide an electrical output on lead 25 indicative of the difference between the mechanical position signals at these mechanical connections on each side of the run lock 21. The lead 25 is connected to the input of amplifier 23.

The power control arrangement 22 which receives electrical control signal from amplifier 23 is directly mechanically coupled to control the position of an elevator 26. The power control arrangement 22 also has a mechanical output ararnged to provide a mechanical feed back signal to the mechanical connection between run lock 21 and the power control arrangement 22. An electrical signal indicative of the mechanical output signal from power control arrangement 22 is fed via a lead 27 to a comparator 28. An electrical signal indicative of the mechanical output position signal of intermediate power control arrangement 16 is fed via a lead 29 to the comparator 28.

An elevator demand signal is fed along lead 11' of automatic pilot arrangement AP2 but is prevented from reaching amplifier 23 by switch S1 which is open. The elevator demand signal is, in this conditon, fed from a summing point SP via a feedback loop including changeover, contacts CO, lead I', to an integrator I and from the integrator output back to the summing point. The integrator I is such that the signal at the summing point is reduced to zero so that when automatic pilot arrangement AP2 takes over control of the aircraft no undue disturbance of the aircraft is caused. For convenience integrator I is the integrator normally provided in the input to each automatic pilot arrangement (not shown in AP1) which, when the respective automatic pilot arrangement is operative to control the aircraft, integrates the control demand signals. With the arrangement shown the integrator in the stand-by automatic pilot arrangement stores a signal equivalent to that stored in the other integrator.

In operation elevator demand signals are fed along lead 11 through amplifier 10 to the power control arrangement 12 which positions the elevator 13, via the direct mechanical connection, according to the elevator demand signal. The run lock 14 is locked up and hence a direct mechanical connection is provided between the power control arrangement 12 and the two intermediate power control arrangements 15 and 16 which respectively position the elevators 17 and 18 associated therewith according to the elevator demand signal. The electrical position signals on the leads 19 and 11 are compared in the automatic pilot arrangement AP1 by means not shown in FIGURE 1. A discrepancy between the position rate signals on the leads 19 and 11 indicates that there is either a fault in the power control arrangement 12 or in the automatic pilot arrangement AP1 and hence control of the aircraft is switched to automatic pilot arrangement AP2 by means not shown in FIGURE 1. A discrepancy between the position signals on lead 20 as compared with those on leads 11 and 19 indicates that there is a fault in the intermediate power control arrangement 15. In this case the elevator demand signal generated in automatic pilot arrangement AP1 is modified to cause the elevators 13, 18 and 26 to be positioned so as to compensate for the incorrect positioning of elevator 17. This arrangement also provides compensation for backlash in the system.

Returning to the normal operation of the system with automatic pilot arrangement AP1 controlling the aircraft, run lock 21 is in its unlocked condition acting merely as a spring. Electrical position signals derived from the electro-mechanical transducer 24 indicative of the difference between the mechanical position conditions obtaining on either side of run lock 21 are fed via the lead 25 and amplifier 23 to control the power control arrangement 22. Hence the power control arrangement 22 controls the position of elevator 26, via the direct mechanical connection, in accordance with the elevator demand signal produced in automatic pilot arrangement AP1, this being achieved without any electrical or mechanical connections between the two automatic pilot arrangements. Electrical signals indicative of the respective mechanical output position signals from power control arrangement 22 and intermediate power control arrangement 16 are fed along leads 27 and 29 to the comparator 28. A discrepancy between these electrical signals indicates that there is either a fault in the power control arrangement 22 or in the intermediate power control arrangement 16 and as a fault in the former power control arrangement 22 would be more serious the automatic pilot arrangement AP2 is prevented from being capable of taking over control of the aircraft.

When it is required to change over to control of the aircraft by automatic pilot arrangement AP2 the run lock 14 is unlocked so that it merely acts as a spring, the run lock 21 is locked up and a switch S1 closed to allow elevator demand signals from means (not shown) in the automatic pilot arrangement AP2 to pass to amplifier 23. With this condition obtaining the power control arrangement 22 continues to control the position of elevator 26 according to the elevator demand signal now derived from automatic pilot arrangement AP2, and also controls the position of elevators 17 and 18 via the intermediate power control arrangements 15 and 16 which are now linked to the power control arrangement 22 via the locked up run lock 21.

Referring now to FIGURE 2 there is shown the system as illustrated in FIGURE 1 in greater detail. Each of the power control arrangements 12 and 22 comprises a torque motor A, a hydraulic valve B, a pump case C, a hydraulic ram D and a torque limiter 30. Each of the intermediate power control arrangements 15 and 16 comprises a hydraulic valve IB, a pump case IC and a hydraulic ram ID. All of the power control arrangements 12, 15, 16 and 22 comprise separate hydraulic servo systems and each has a feed back path 31, 32, 33 and 34 respectively between its hydraulic ram D and its hydraulic valve B.

The power control arrangement 12 and it associated run lock 14 are controlled from a power junction box relay arrangement 35 in automatic pilot arrangement AP1. The power control arrangement 22 and its associated run lock 21 are controlled by a power junction box relay arrangement 36 in automatic pilot arrangement AP2. The power junction box relay arrangement 36 is controlled in turn from a change over relay 37 whose actuation causes automatic pilot arrangement AP2 to take over control of the aircraft from automatic pilot arrangement AP1. The power junction box relay arrangement 35 is controlled by means (not shown) in the automatic pilot arrangement AP1.

Change over relay 37 is isolated physically from both the automatic pilot arrangements AP1 and AP2. The change over relay 37 is energised (or deenergised) by automatic pilot arrangement AP1 and contacts of this relay 37 are connected to automatic pilot arrangement AP2. Hence it can be seen that there are no electrical connections between the automatic pilot arrangements AP1 and AP2.

When control of the aircraft is transferred from automatic pilot arrangement AP1 to AP2 the comparators in automatic pilot arrangement AP2 are, during the transition period, prevented from operating. This is to prevent a comparator from preventing the automatic pilot arrangement AP2 from taking over control of the aircraft due to spurious errors being detected during this transition period.

Each of the two automatic pilot arrangements AP1 and AP2 produce an elevator demand signal and also each independently produce comparison demand signals. When automatic pilot arrangement AP2 is not in use controlling the aircraft the elevator demand signal is fed via a relay contact S2 and a filter 38 to a comparator 39. The comparison demand signal is fed via a filter unit 40 to the comparator 39. When a predetermined error between the elevator demand signal and the comparison demand signal is determined by comparator 39 the automatic pilot arrangement AP2 is prevented from taking over control of the aircraft.

The operation of the system will now be described with reference to FIGURE 2 for each of a number of modes which can obtain. Firstly as shown in FIGURE 2 automatic pilot arrangement AP1 is controlling the aircraft and automatic pilot arrangement AP2 is in a stand-by condition from which it can if required take over control of the aircraft from the automatic pilot arrangement AP1.

With this condition obtaining the junction box relay arrangement 35 in automatic pilot arrangement AP1 controls the run lock 14 via leads 41 such that it is in a locked up condition. The junction box relay arrangement 35 also controls torque motor A of power control arrangement 12 via lead 42 such that it is unlocked and also controls the torque limiter 30 of power control arrangement 12 via lead 43 such that it is locked up. The junction box relay arrangement 36 in automatic pilot arrangement AP2 controls the run lock 21 via leads 44 such that the run lock is unlocked and acts as a spring. The junction box relay arrangement 36 also controls the torque motor A of power controls arrangement 22 via lead 45 such that it is unlocked and control the torque limiter 30 of power control arrangement 22 via lead 46 such that it is locked up.

The elevator demand signal derived in automatic pilot arrangement AP1 is fed from amplifier 10 along lead 47 to control the operation of torque motor A of power control arrangement 12. Thus the elevator 13 is controlled directly from this power control arrangement 12 and also controls the positioning of the elevators 17 and 18 via the locked up run lock 14 and the hydraulic connections to the intermediate power control arrangements 15 and 16. The difference in the mechanical position rate signals on either side of the unlocked run lock 21 is sensed by the electro-mechanical transducer 24 and an electrical difference signal is fed along the lead 25 to the amplifier 23 of automatic pilot arrangement AP2. The signal from amplifier 23 is fed along lead 48 to control the torque motor A of the power control arrangement 22 and thus control the position of elevator 26.

Considering now the control of the aircraft during cruise as opposed to during flare, the junction box relay arrangement 36 controls the run lock 21 via leads 44 such that the run lock 21 is unlocked. The junction box relay arrangement 36 also controls the torque motor A of the power control arrangement 22 such that it is locked up and controls the torque limiter 30 of power control arrangement 22 via lead 46 such that it is unlocked. Thus now the power control arrangement 22 acts in the same manner as the intermediate power control arrangements 15 and 16 and the positioning of elevator 26 is effectively under control of power control arrangement 12.

Reverting now to the initial condition in which automatic pilot arrangement AP1 is controlling the aircraft and automatic pilot arrangement AP2 is in a stand-by condition from which it can take over control of the aircraft if a fault is found to occur in automatic pilot arrangement AP1 the change over relay 37 is actuated. With this condition obtaining the junction box relay arrangement 35 controls the run lock 14 via the leads 41 such that it is unlocked. Also the junction box relay arrangement 35 controls the torque motor A of the power control arrangement 12 such that it is locked up and controls the torque limiter 30 of the power control arrangement 12 via lead 43 such that it is unlocked. The junction box relay arrangement 36 controls the run lock 21 via leads 44 such that it is locked up. The junction box relay arrangement 36 also controls the torque motor A of the power control arrangement 22 via lead 45 such that it is unlocked and controls the torque limiter 30 of the power control arrangement 22 via lead 46 such that it is locked up. The change over relay 37 in changing over causes actuation of the relays S1/1, S2/1 and S3/1 to become actuated so changing the condition of the respective contacts S1, S2 and S3. Hence now the elevator demand signal derived in automatic pilot arrangement AP2 is fed via contact S1 to the amplifier 23 and then via lead 48 to control torque motor A of power control arrangement 22. The elevator 26 is then controlled according to the elevator demand signal derived in automatic pilot arrangement AP2 as are the elevators 17 and 18 which are controlled by their respective intermediate power control arrangements 15 and 16 via the direct mechanical link through the locked up run lock 21 to the power control arrangement 22. In this condition unless there is a fault in the power control arrangement 12 the elevator 13 is also controlled from the power control arrangement 22, the power control arrangement 12 acting as an intermediate power control arrangement via the unlocked run lock 14.

It should be appreciated that a number of modifications could be made to the embodiment shown without departing from the scope of the invention. For example the sensing of the positions of elevators 13 and 26 to derive the difference signal which is fed to amplifier 23 could be derived directly from the elevators 13 and 26 rather than from either side of the run lock 21.

It should also be noted that the embodiment discloses a system in which automatic change over from one automatic pilot arrangement to a further isolated one for controlling an aircraft can be achieved extremely quickly as both the automatic pilot arrangements and their ancillary equipments are functioning in synchronism although one automatic pilot arrangement is alone controlling the aircraft. The system as shown is particularly suited to be switched in for use at the stage of flaring an aircraft when approaching to land at which time the aircraft is relatively close to the ground and requires extremely swift remedial action if a fault should occur in an automatic pilot arrangement controlling this approach.

We claim:

1. An aircraft automatic pilot system comprising first and second automatic pilot arrangements each capable of controlling the aircraft in flight; a first control arrangement coupled to said first automatic pilot arrangement and capable of controlling the position of a first aircraft control surface according to control signals received from said first automatic pilot arrangement; a second control arrangement coupled to said second automatic pilot arrangement and capable of controlling the position of a second aircraft control surface according to signals received from said second automatic pilot arrangement; means coupled to said automatic pilot arrangements for putting into use alternatively said first and second automatic pilot arrangement; means coupled between said second control arrangement and said first control arrangement for effecting appropriate control of the first control surface when said second automatic pilot arrangement is in use; a comparator coupled to said first and second control arrangements and adapted to compare signals representative of the positions of the first and second control surfaces and to give an error output representative of any difference therebetween, the error output, when said first automatic pilot arrangement is in use, being coupled to the second control arrangement, to control the second control surface.

2. An automatic pilot system as claimed in claim 1 wherein the error output from said comparator is coupled as input to said second automatic pilot arrangement to control said second control arrangement.

3. An automatic pilot system as claimed in claim 1 wherein intermediate control arrangements are provided for effecting control of further respective aircraft control surfaces, each intermediate control arrangement being mechanically linked with one of the aforementioned control arrangements.

4. An automatic pilot system as claimed in claim 3 wherein the intermediate control arrangement are selectively linkable with the first and second control arrangements in accordance with the particular automatic pilot arrangement in use.

5. An automatic pilot system as claimed in claim 1 wherein there is provided coupled to each automatic pilot arrangement a monitoring arrangement and to the respective control arrangements and adapted to compare the input signal to the automatic pilot in use, which input signal is representative of the required control surface position, with a monitor signal representative of the actual position of the control surface controlled by the associated control arrangement, said monitoring arrangement being coupled to said means for putting into use alternatively said automatic pilot arrangements to cause the automatic pilot arrangement not in use to take over control of the aircraft if a predetermined difference between the control signal and the monitor signal is determined by this comparison.

6. An automatic pilot system as claimed in claim 1 wherein the automatic pilot arrangement in use is adapted to be coupled to at least one control surface in addition to said first and second control surfaces and wherein there is provided a monitoring arrangement adapted to be coupled to the said at least one control surface and the control arrangement of the automatic pilot arrangement not in use for comparing signals representative of the actual positions of the said at least one control surface and the control surface controlled through the control arrangement associated with the automatic pilot arrangement not in use, said monitoring arrangement being coupled to the automatic pilot arrangement not in use to prevent the automatic pilot arrangement not in use from taking over control of the aircraft if a predetermined difference in the positions of the control surface and the further control surface is determined by this comparison.

7. An automatic pilot system as claimed in claim 1 wherein the automatic pilot arrangement in use is adapted to be coupled to at least one control surface in addition to said first and second control surfaces, and wherein there is provided a monitoring arrangement adapted to be coupled to said at least one control surface and the automatic pilot arrangement in use for comparing the control signal to the automatic pilot arrangement with a signal representative of the position of the said at least one control surface for modifying the output from the automatic pilot arrangement in use to produce compensating movements for the first and second control surface and any further control additional surfaces if the actual position of the said at least one control surface is incorrect by more than a predetermined amount.

8. An automatic pilot system as claimed in claim 1 further comprising an input terminal, a feedback loop connected thereto, and an integrator connected to the feedback loop, whereby when an automatic pilot arrangement is not in use, the control signal therefor is applied to the input terminal, feedback loop and integrator, the feedback loop being effective to maintain the potential of the input signal at zero level while the automatic pilot arrangement is disconnected therefrom.

9. An automatic pilot system as claimed in claim 8, wherein one of said integrators is provided in each automatic pilot arrangement for the purpose of integrating, when the respective automatic pilot arrangement is effective to control the aircraft, control signals therefor, whereby the integrator of the automatic pilot arrangement not in use stores a signal equivalent to the signal stored in the integrator of the automatic pilot arrangement which is in use.

10. An automatic pilot system as claimed in claim 1 further comprising selectively energisable run-locks coupled to the first and second control arrangements, and intermediate control arrangements to which the run-locks are coupled.

References Cited

UNITED STATES PATENTS 3,071,336   1/1963   Fearnside _____ 244—77

MILTON BUCHLER, *Primary Examiner.*

FERGUS S. MIDDLETON, *Examiner.*

B. BELKIN, *Assistant Examiner.*